US011988363B1

(12) United States Patent
Jankovsky et al.

(10) Patent No.: US 11,988,363 B1
(45) Date of Patent: May 21, 2024

(54) LIGHTING ELEMENT

(71) Applicant: Crenshaw Lighting LLC, Floyd, VA (US)

(72) Inventors: Lucas Jankovsky, Floyd, VA (US); Matthew Vest, Floyd, VA (US)

(73) Assignee: Crenshaw Lighting LLC, Floyd, VA (US)

( * ) Notice: Subject to any disclaimer, the term of this patent is extended or adjusted under 35 U.S.C. 154(b) by 0 days.

(21) Appl. No.: 18/207,456

(22) Filed: Jun. 8, 2023

(51) Int. Cl.
*F21V 21/02* (2006.01)
*F21V 3/04* (2018.01)
*F21V 19/00* (2006.01)
*F21Y 115/10* (2016.01)

(52) U.S. Cl.
CPC .............. *F21V 21/02* (2013.01); *F21V 3/049* (2013.01); *F21V 19/003* (2013.01); *F21Y 2115/10* (2016.08)

(58) Field of Classification Search
CPC ......... F21V 21/02; F21V 3/049; F21V 19/003
See application file for complete search history.

(56) References Cited

U.S. PATENT DOCUMENTS 3,868,501 A 2/1975 Barbour
6,000,812 A 12/1999 Freeman et al.
6,119,382 A 9/2000 Hakkert
6,220,723 B1 4/2001 Freeman et al.
6,280,054 B1 8/2001 Cassarly et al.
8,733,001 B2 5/2014 Gallet
10,492,263 B2 11/2019 Miller et al.
2008/0304250 A1 12/2008 Harbers et al.
2009/0002986 A1 1/2009 Medendorp, Jr. et al.
2009/0015930 A1* 1/2009 Hikmet .................. G02B 5/206 427/598
2010/0172152 A1 7/2010 Boonekamp
2010/0220497 A1* 9/2010 Ngai .................... G02B 6/0068 362/610
2012/0236586 A1* 9/2012 Wang ........................ F21V 5/00 362/555
2012/0250322 A1 10/2012 Dreeben et al.
2012/0281407 A1 11/2012 Sinofsky
2012/0327651 A1 12/2012 Cornelssen et al.
2013/0258652 A1 10/2013 Hsieh et al.
2013/0301249 A1 11/2013 Ngai et al.
2016/0369972 A1 12/2016 Thijssen et al.
(Continued)

*Primary Examiner* — Arman B Fallahkhair
(74) *Attorney, Agent, or Firm* — Thompson Coburn LLP

(57) ABSTRACT

A lighting element configured to be mounted on a mounting surface. The lighting element comprises a base member, at least one forward member, and at least one base-illuminating light source. The base member is adjacent the mounting surface when mounted and has a base member front surface positioned to face away from the mounting surface when mounted. The at least one forward member has a front surface and a rear surface opposite the front surface. The rear surface is spaced from and in face-to-face relationship with the base member front surface. The at least one base-illuminating light source is adjacent the forward member rear surface, is adapted to emit light, and is positioned to project light toward the base member front surface and such that no portion of the at least one base-illuminating light source extends beyond the forward member front surface nor rearward beyond the forward member rear surface.

7 Claims, 7 Drawing Sheets

(56) References Cited

U.S. PATENT DOCUMENTS

| | | | |
|---|---|---|---|
| 2017/0370554 | A1* | 12/2017 | MacKinnon ........ H01S 5/18386 |
| 2018/0202629 | A1* | 7/2018 | Takeshita ................ F21V 3/049 |
| 2018/0259141 | A1 | 9/2018 | Yamaguchi et al. |
| 2018/0335188 | A1* | 11/2018 | Di Trapani ........... F21V 7/0008 |
| 2019/0032872 | A1 | 1/2019 | Crosby et al. |
| 2019/0181545 | A1 | 6/2019 | Lu |
| 2019/0277463 | A1 | 9/2019 | Santos et al. |
| 2019/0293277 | A1 | 9/2019 | Yamaguchi et al. |
| 2021/0190279 | A1 | 6/2021 | Fujii et al. |
| 2022/0099278 | A1 | 3/2022 | Koerner |

* cited by examiner

LIGHTING ELEMENT

CROSS-REFERENCE TO RELATED APPLICATIONS

Not Applicable.

STATEMENT REGARDING FEDERALLY SPONSORED RESEARCH OR DEVELOPMENT

Not Applicable.

APPENDIX

Not Applicable.

BACKGROUND OF THE INVENTION

Field of the Invention

This invention pertains to a lighting element.

SUMMARY

One aspect of the disclosure is a lighting element configured to be mounted on a mounting surface, such as a wall or ceiling. The lighting element comprises a base member, at least one forward member, and at least one base-illuminating light source. The base member is adapted to be adjacent the mounting surface when the lighting element is mounted on the mounting surface. The base member has a base member front surface positioned to face away from the mounting surface when the lighting element is mounted on the mounting surface. The at least one forward member has a forward member front surface and a forward member rear surface opposite the forward member front surface. The forward member rear surface is spaced from and in face-to-face relationship with the base member front surface. The at least one base-illuminating light source is adjacent the forward member rear surface. The at least one base-illuminating light source is adapted to emit light. The at least one base-illuminating light source is positioned such that no portion of the at least one base-illuminating light source extends forward beyond the forward member front surface nor rearward beyond the forward member rear surface. The at least one base-illuminating light source is positioned to project light toward the base member front surface when the light source is emitting light.

Another aspect of the disclosure is a lighting element configured to be mounted on a mounting surface, such as a wall or ceiling. The lighting element comprises a base member, at least one forward member, and at least one base-illuminating light source. The base member is adapted to be adjacent the mounting surface when the lighting element is mounted on the mounting surface. The base member has a base member front surface positioned to face away from the mounting surface when the lighting element is mounted on the mounting surface. The at least one forward member has a forward member front surface and a forward member rear surface opposite the forward member front surface. The forward member rear surface is spaced from and in face-to-face relationship with the base member front surface. The at least one base-illuminating light source is adjacent the forward member rear surface. The at least one base-illuminating light source is adapted to emit light and positioned to project light toward the base member front surface when the light source is emitting light. The forward member includes at least one opening extending from the forward member rear surface to the forward member front surface. The opening comprises a gap extending along a gap length from a first gap end to a second gap end. The forward member includes a first gap edge and a second gap edge opposing the first gap edge. The first and second gap edges define the gap. The first gap edge comprises a first undulating curve that has a plurality of inflection regions. The second gap edge comprises a second undulating curve that has a plurality of inflection regions. The gap is sized and positioned such that the base member front surface is visible through the gap when the at least one base-illuminating light source is emitting light and illuminating the base member front surface.

Yet another aspect of the disclosure is a lighting element configured to be mounted on a mounting surface, such as a wall or ceiling. The lighting element comprises a base member, at least one forward member, and at least one base-illuminating light source. The base member is adapted to be adjacent the mounting surface when the lighting element is mounted on the mounting surface. The base member has a base member front surface positioned to face away from the mounting surface when the lighting element is mounted on the mounting surface. The at least one forward member has a forward member front surface and a forward member rear surface opposite the forward member front surface. The forward member rear surface is spaced from and in face-to-face relationship with the base member front surface. The forward member rear surface is spaced from the base member front surface a distance of not more than two inches. The forward member front surface lies in a first plane. The forward member rear surface lies in a second plane. The first plane is spaced from the second plane a distance of at least one-fourth inch and not more than one-half inch. The at least one base-illuminating light source is a chip-on-board solid state lighting source adapted to emit light. The at least one forward member and the at least one base-illuminating light source are thermally coupled such that the at least one forward member acts as a heat sink for the at least one base-illuminating light source.

Still another aspect of the disclosure is a lighting element configured to be mounted on a wall. The lighting element comprises a base member, at least one forward member, at least one base-illuminating light source, and a wall-illuminating light source. The base member is adapted to be adjacent the wall when the lighting element is mounted on the wall. The base member has a base member front surface positioned to face away from the wall when the lighting element is mounted on the wall. The at least one forward member has a forward member front surface and a forward member rear surface opposite the forward member front surface. The forward member rear surface is spaced from and in face-to-face relationship with the base member front surface. The forward member includes a first longitudinal edge portion, a second longitudinal edge portion, a first lateral edge portion, and a second lateral edge portion. The first longitudinal edge portion is opposite the second longitudinal edge portion. The first lateral edge portion is opposite the second longitudinal edge portion. The forward member extends laterally from the first longitudinal edge portion to the second longitudinal edge portion. The forward member extends longitudinally from the first lateral edge portion to the second lateral edge portion. The forward member includes at least one opening extending from the forward member rear surface to the forward member front surface. The at least one opening is sized and positioned such that the base member front surface is visible through the at least one opening when the at least one base-illuminating light source is emitting light and illuminating the base member front surface. The opening comprises a gap extending along a gap length from a first gap end to a second gap end. The first gap end is adjacent one of the longitudinal or lateral edge portions. The at least one base-illuminating light source is adjacent the forward member rear surface. The at least one base-illuminating light source is adapted to emit light. The at least one base-illuminating light source is positioned to project light toward the base member front surface when the light source is emitting light. The wall-illuminating light source is positioned and configured to emit a beam of light radiating away from the base member and along a flat wall at a divergence of less than 10° when the lighting element is mounted to the flat wall with the base member adjacent the flat wall. The wall-illuminating light source is positioned and configured to emit the beam of light in a manner aligned with the first gap end.

Further features and advantages, as well as the operation, are described in detail below with reference to the accompanying drawings.

Figure 1:
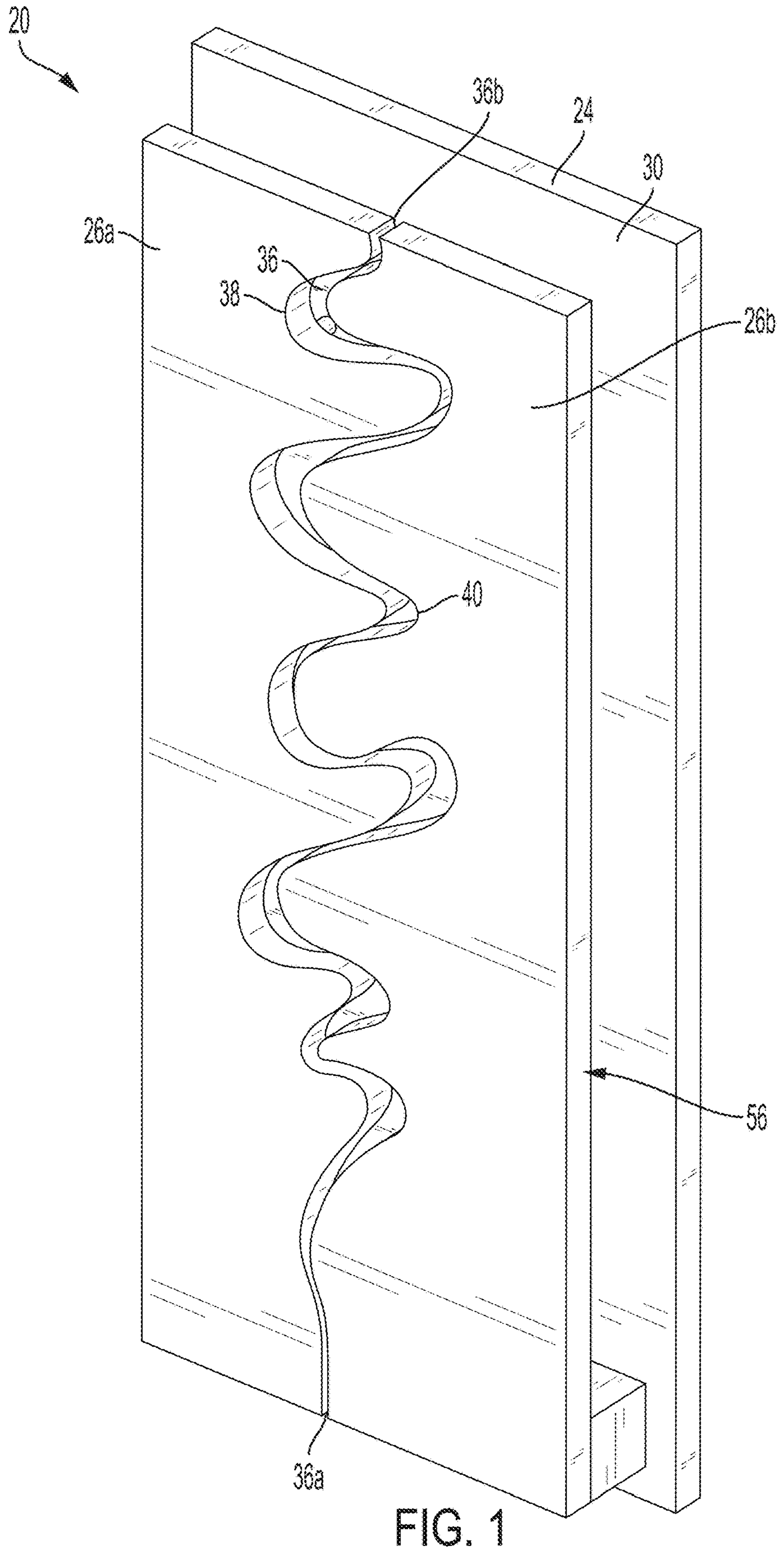
FIG. 1 is a perspective view of a lighting element.

Reference numerals in the written specification and in the figures indicate corresponding items.

DETAILED DESCRIPTION

An embodiment of a lighting element in accordance with the present disclosure is indicated generally by reference number 20. The lighting element 20 is configured to be mounted on a mounting surface 22, such as a wall or ceiling. The lighting element 20 comprises a base member 24, a first forward member 26*a*, a second forward member 26*b*, a first base illuminating light source 28*a*, and a second base illuminating light source 28*b*. Alternatively, the forward member may be a single unitary member and the light source may be a single unitary light source.

The base member 24 is adapted to be adjacent the mounting surface 22 when the lighting element 20 is mounted on the mounting surface. The base member 24 has a base member front surface 30 positioned to face away from the mounting surface 22 when the lighting element 20 is mounted on the mounting surface.

The first and second forward members 26*a*, 26*b* each have a forward member front surface 32 and a forward member rear surface 34 opposite the forward member front surface. The forward member front surface 32 lies in a first plane $P_1$ and the forward member rear surface 34 lies in a second plane $P_2$. The first plane $P_1$ is preferably spaced from the second plane $P_2$ a distance of at least one-fourth inch and not more than one-half inch. The forward member rear surface 34 is spaced from and in face-to-face relationship with the base member front surface 30. For example, the forward member rear surface 34 is spaced from the base member front surface 30 a distance of not more than two inches. In this embodiment, the base member front surface 30 lies in a plane that is parallel to the first and second planes $P_1$ and $P_2$.

The base member 24 and the first and second forward members 26*a*, 26*b* comprise a variety of materials that are opaque, transparent, and/or translucent. For example, the base member 24 and the first and second forward members 26*a*, 26*b* may comprise brass, aluminum, steel, bronze, glass, plastic, and/or any other suitable material.

The base member front surface 30, the forward member front surface 32, and the forward member rear surface 34 are each flat. It should be understood that the base member front surface 30, the forward member front surface 32, and the forward member rear surface 34 may alternatively be convex, concave, or some combination of flat, convex, and/or concave. It should also be understood that the forward member rear surface 34 could be a peripheral edge.

Figure 5:
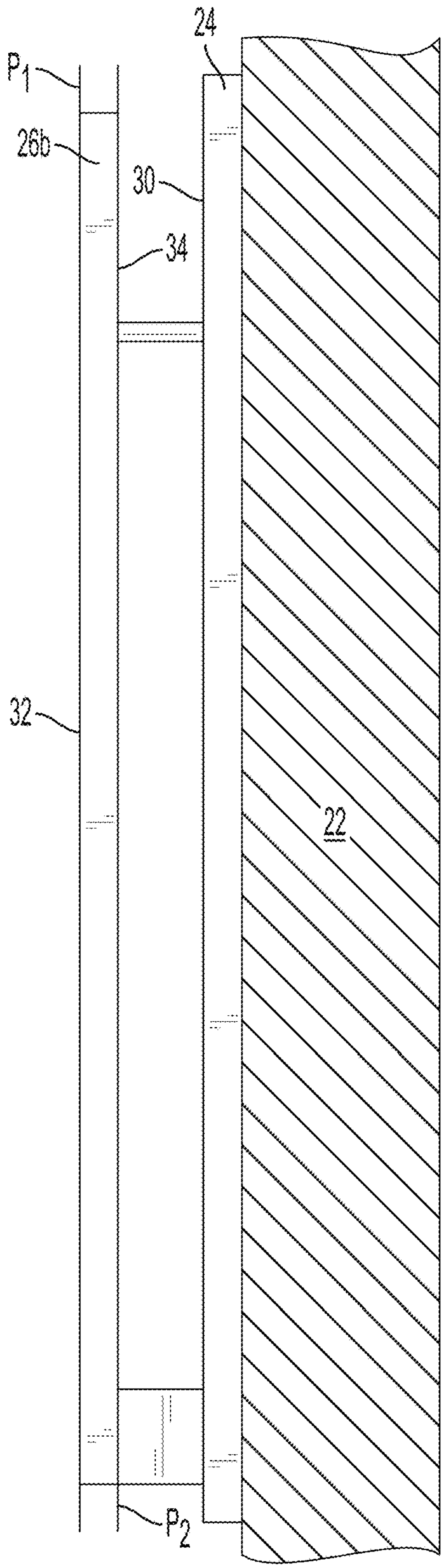
FIG. 5 is a right side view of the lighting element of FIG. 1.
Figure 6:
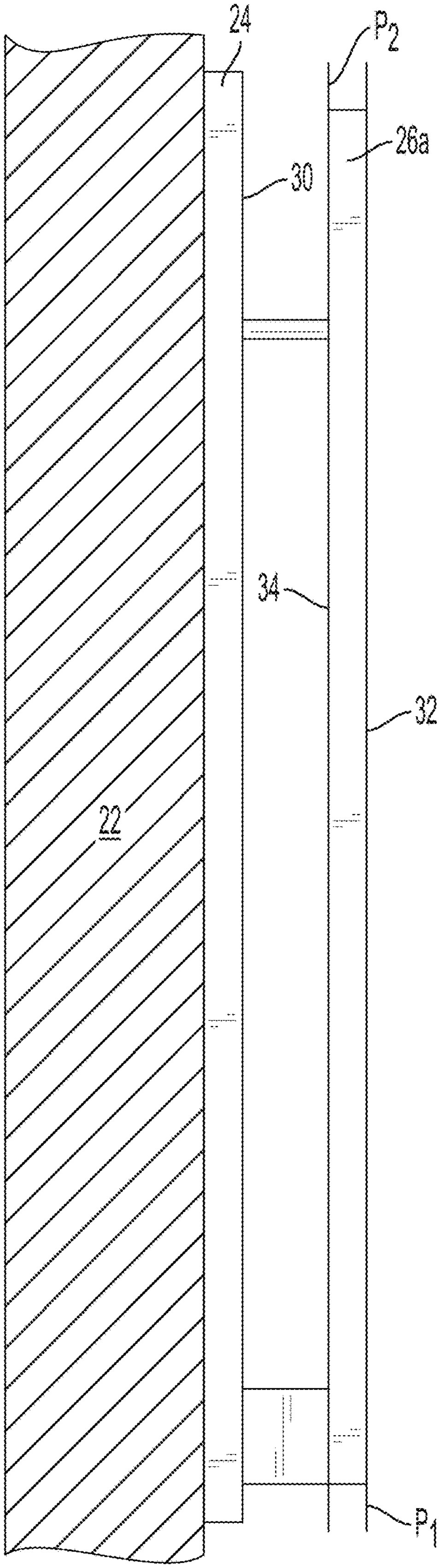
FIG. 6 is a left side view of the lighting element of FIG. 1.
Figure 7:
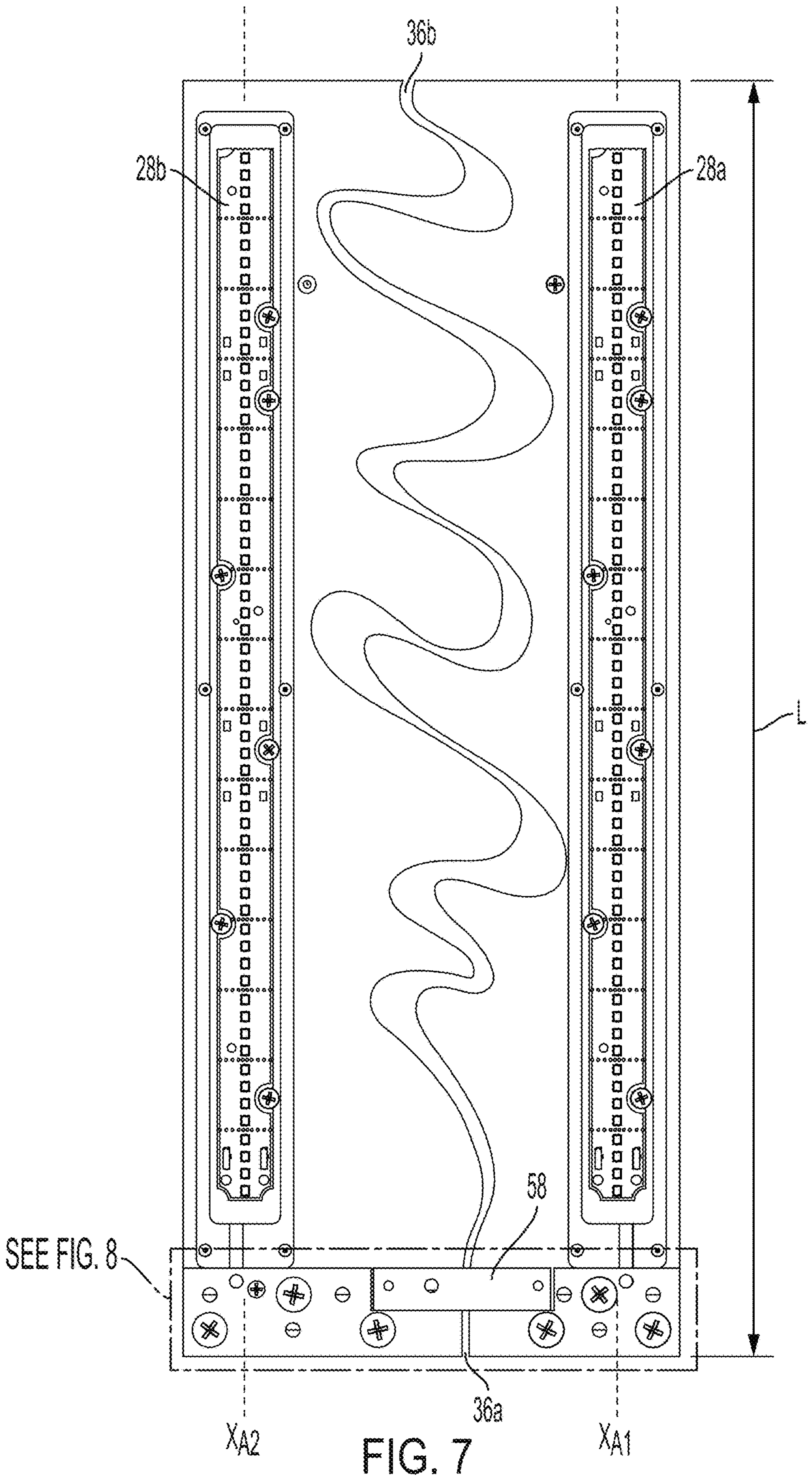
FIG. 7 is a rear view of the lighting element of FIG. 1, with the base member removed to show the base-illuminating light sources.
Figure 8:
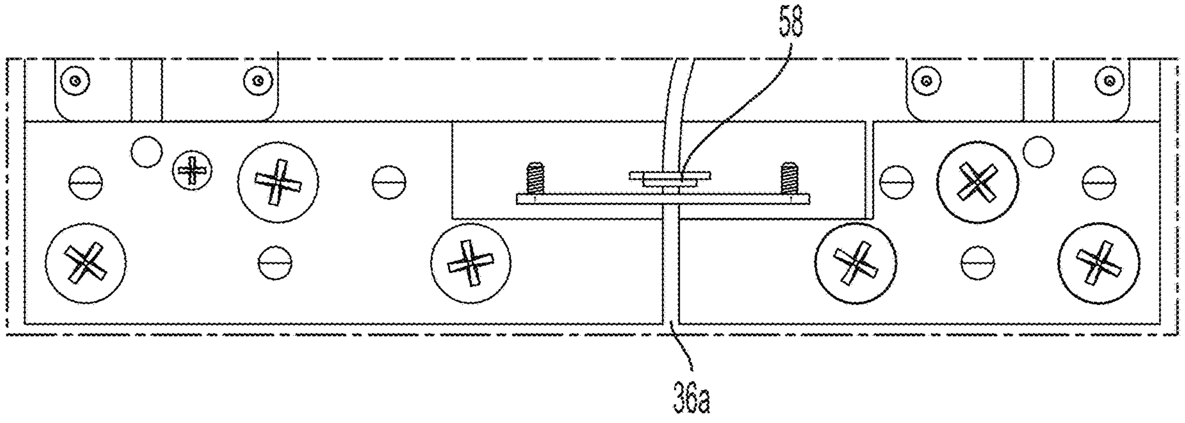
FIG. 8 is a magnified view of the wall-illuminating light source of FIG. 7, with additional components removed.
Figure 9:
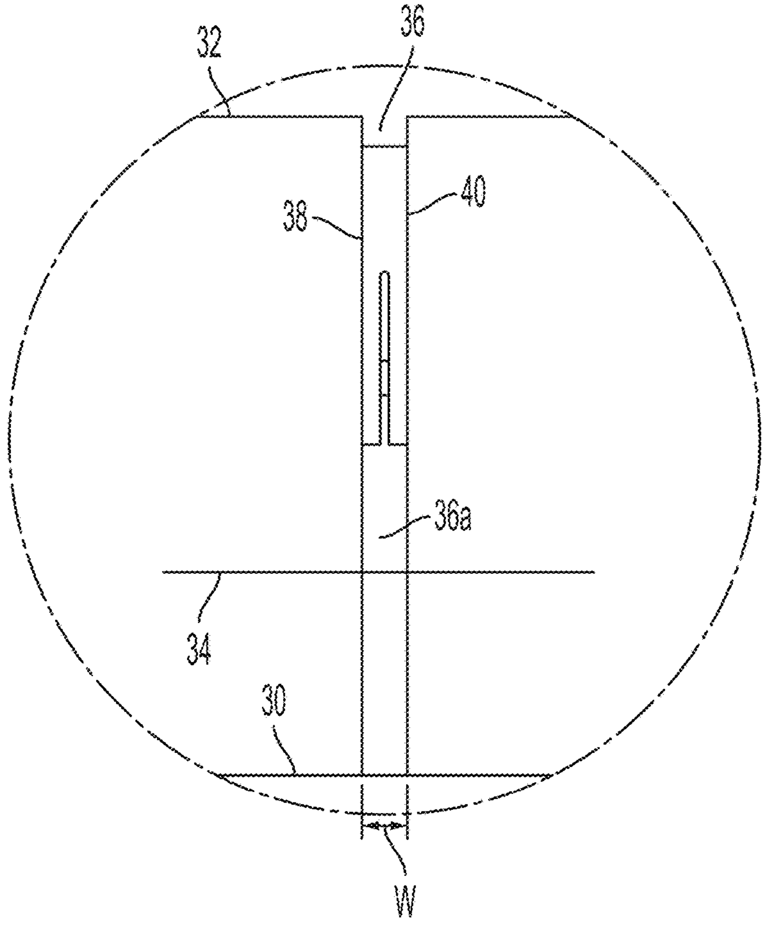
FIG. 9 is a magnified view of the wall-illuminating light source as shown in FIG. 4.

The first base-illuminating light source 28*a* is adjacent the forward member rear surface 34 of the first forward member 26*a* and within a recess in the first forward member such that the rear-most portion of the first base-illuminating light source is preferably flush with the forward member rear surface. The second base-illuminating light source 28*b* is adjacent the forward member rear surface 34 of the second forward member 26*b* and within a recess in the second forward member such that the rear-most portion of the second base-illuminating light source is preferably flush with the forward member rear surface. The first and second base-illuminating light sources 28*a*, 28*b* are adapted to emit light. The first base-illuminating light source 28*a* is preferably positioned such that no portion of the first base-illuminating light source extends forwardly (e.g., from right to left in relation to FIG. 5) beyond the forward member front surface 32 of the first forward member 26*a* nor rearwardly (e.g., from left to right in relation to FIG. 5) beyond the forward member rear surface 34 of the first forward member. Likewise, the second base-illuminating light source 28*b* is preferably positioned such that no portion of the at second base-illuminating light source extends forwardly (e.g., from right to left in relation to FIG. 5) beyond the forward member front surface 32 of the second forward member 26*b* nor rearwardly (e.g., from left to right in relation to FIG. 5) beyond the forward member rear surface 34 of the second forward member. In other words, the base-illuminating light sources 28*a*, 28*b* are entirely between the forward member front and rear surfaces of the respective forward members 26*a*, 26*b*. The first and second one base-illuminating light sources 28*a*, 28*b* are positioned to project light toward the base member front surface 30 when the light sources are emitting light. If the forward members 26*a*, 26*b* are of opaque materials (e.g., brass) and the lighting element 20 is mounted on a wall with the base-illuminating light sources 28*a*, 28*b* emitting light, the only light from the base-illuminating light sources that an ordinary person sees, viewing the lighting element from either a front side elevational view, a side elevational view, a top plan view, or a bottom plan view, is reflected light. The first and second base-illuminating light source 28*a*, 28*b* preferably comprises a chip-on-board solid state lighting source. The first base-illuminating light source 28*a* comprises a first array of light emitting diodes 28*a* and the second base illuminating light source 28*b* comprises a second array of light emitting diodes 28*b*. The first array of light emitting diodes 28*a*, extends along an array axis $X_{A1}$. Likewise, the second array of light emitting diodes 28*b*, extends along an array axis $X_{A2}$.

The forward members 26*a*, 26*b* includes at least one opening 36 extending between the first forward member 26*a* and the second forward member 26*b*, and from the forward member rear surface 34 of each of the forward members to the forward member front surface 32 of each of the forward members. The opening 36 is sized and positioned such that the base member front surface 30 is visible through the opening when the first and second base-illuminating light sources 28*a*, 28*b* are emitting light and illuminating the base member front surface.

The first forward member 26*a* comprises a first piece 26*a*, and the second forward member 26*b* comprises a second piece 26*b*. The opening 36 comprises a gap 36 between the first and second pieces 26*a*, 26*b*. The gap 36 extends along a gap length L from a first gap end 36*a* to a second gap end 36*b*.

The first piece 26*a* includes a first gap edge 38, which is an edge of the first piece. The second piece 26*b* includes a second gap edge 40, which is an edge of the second piece. The second gap edge 40 opposes the first gap edge 38. The first and second gap edges 38, 40 define the gap 36.

Figure 2:
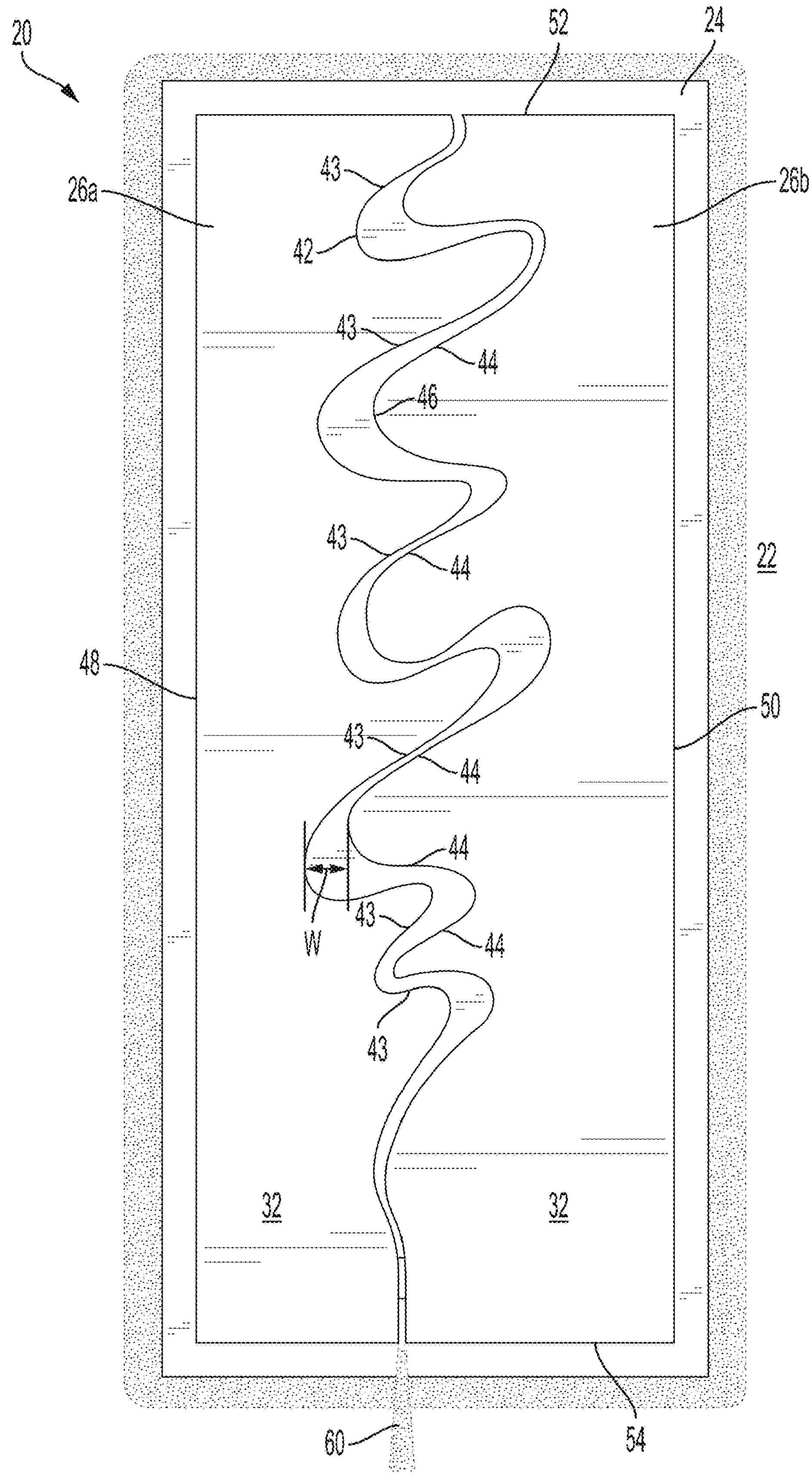
FIG. 2 is a front view of the lighting element of FIG. 1.
Figure 3:
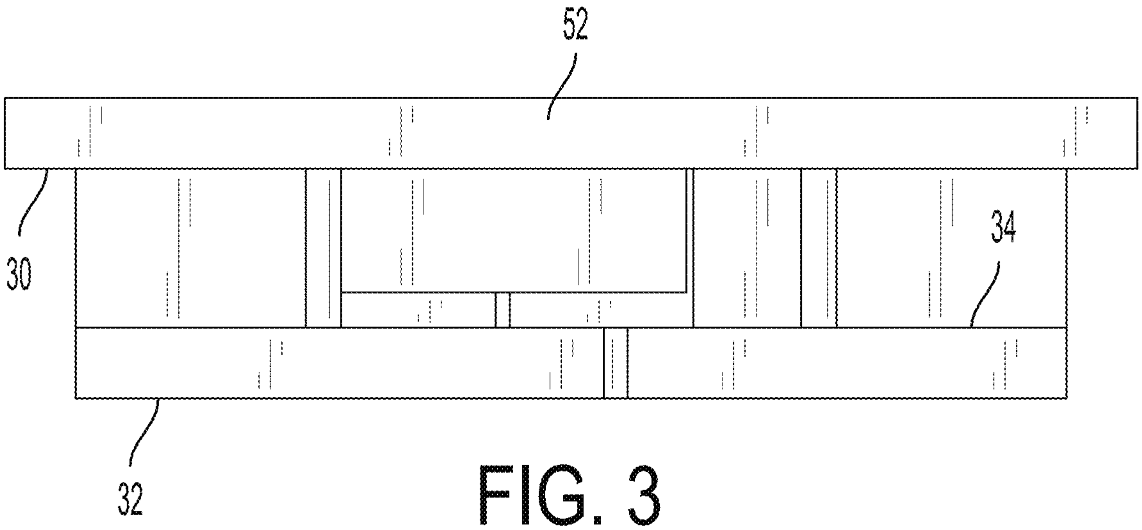
FIG. 3 is a top view of the lighting element of FIG. 1.
Figure 4:
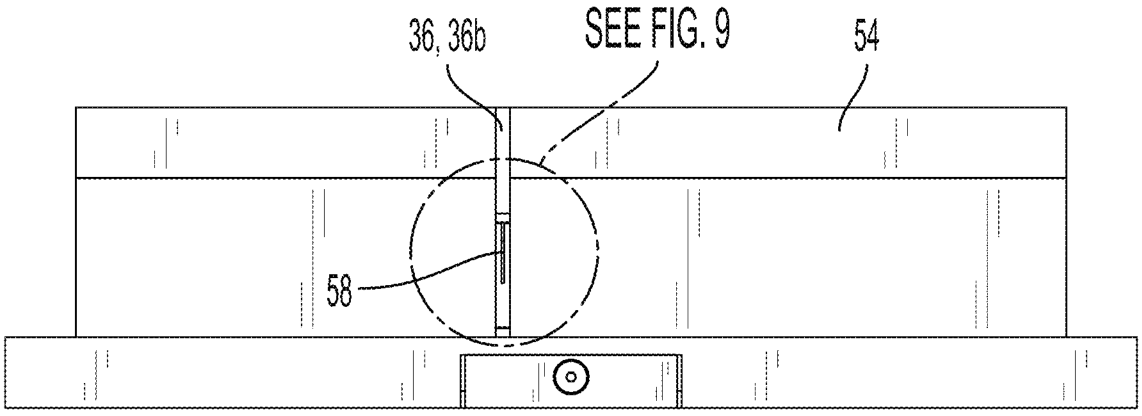
FIG. 4 is a bottom view of the lighting element of FIG. 1.

As shown in FIG. 2, the first gap edge 38 comprises a first undulating curve 42 having a plurality of inflection regions 43 in which the first undulating curve transitions from convex to concave, or from straight to convex or concave. The second gap edge 40 comprises a second undulating curve 46 having a plurality of inflection regions 44 in which the second undulating curve transitions from convex to concave, or from straight to convex or concave.

The gap 36 has a gap width W. The gap width W is a transverse distance between the first and second gap edge 38, 40. The first and second undulating curves 42, 46 are preferably dissimilar such that the gap width W varies along the length of the gap 36. Alternatively, the first and second undulating curves 42, 46 may be similar and aligned such that the gap width is uniform along the length of the gap 36, or similar and unaligned such that the gap width varies along the length of the gap. This configuration provides artistic and aesthetic designs on the first and second forward members 26*a*, 26*b*, resembling a flowing river of light. Of course, other artistic and aesthetic designs could be included instead.

As shown in FIG. 2, the first forward member 26*a* includes a first longitudinal edge portion 48, the second forward member 26*b* includes a second longitudinal edge portion 50, and each of the first and second forward members have a first lateral edge portion 52 and a second lateral edge portion 54. The first longitudinal edge portion 48 is opposite the second longitudinal edge portion 50, and the first lateral edge portion 52 is opposite the second longitudinal edge portion 54. It should be understood that the terms "longitudinal" and "lateral" as used in the relative sense to refer to two directions which may be cross-wise to one another. The longitudinal edge portion is not necessarily the longest dimension (and likewise the lateral edge portion is not necessarily the shortest dimension), and the terms need not refer to vertical and horizontal directions. As used herein, the terms encompass a forward member, for example, that is round, oval, square, rectangular, polygonal, or any other shape.

The first forward member 26*a* extends laterally from the first longitudinal edge portion 48 to first gap edge, and the second forward member extends laterally from the second gap edge to the second longitudinal edge portion 50. Both the first and second forward members 26*a*, 26*b* extend longitudinally from the first lateral edge portion 52 to the second lateral edge portion 54. The first gap end 36*a* may be adjacent one of the first longitudinal and first lateral edge portions 48, 52, and the second gap end may be adjacent the edge portion opposite said one of the first longitudinal and first lateral edge portions (i.e., adjacent one of the second longitudinal and second lateral edge portions 50, 54).

In the embodiment shown in the figures, the first and second forward members 26*a*, 26*b* collectively have a periphery 56 that is rectangular in shape, though it is to be understood that the forward member may have a periphery of other shapes (e.g., circular, oval, square, rectangular, polygonal, or any other shape). The first and second longitudinal edge portions 48, 50, and the first and second lateral edge portions 52, 54 are edge portions of the periphery 56.

When the lighting element 20 is configured to be mounted on a wall 22 (e.g., when the lighting element is used as a sconce), the lighting element may further comprise a wall-illuminating light source 58. The wall-illuminating light source 58 is positioned and configured to emit a beam of light 60 radiating away from the base member 24 and along a flat wall at a divergence of less than 10°, as viewed in a front elevation view, when the lighting element 20 is mounted on the flat wall with the base member adjacent the flat wall. The first gap end 36*a* is adjacent one of the longitudinal or lateral edge portions 48, 50, 52, 54. The wall-illuminating light source 58 is positioned and configured to emit the beam of light 60 in a manner aligned with the first gap end.

The first forward member 26*a* and the first base-illuminating light source 28*a* may be thermally coupled such that the first forward member acts as a heat sink for the first base-illuminating light source. Likewise, the second forward member 26*b* and the second base-illuminating light source 28*b* may be thermally coupled such that the second forward member acts as a heat sink for the second base-illuminating light source. This configuration permits the driver for the respective base-illuminating light sources (not shown) to drive the respective base-illuminating light sources at a higher voltage while still maximizing the longevity of the respective base-illuminating light sources by reducing the operating temperature of the respective base-illuminating light sources. Preferably, the first and second forward members 26*a*, 26*b* each have a thermal conductivity greater than 50 W/m-K at 20° Celsius and a surface area greater than 125 square inches. More preferably, the first and second forward members 26*a*, 26*b* each have a thermal conductivity greater than 100 W/m-K at 20° Celsius and a surface area greater than 125 square inches.

The base member front surface 30 comprises a metal member, with the base member front surface being the front surface of the metal member. The base member front surface 30 may have a grain finish with a grain pattern comprising straight lines. For example, the grain pattern may be a brushed metal pattern. The straight lines of the grain pattern may extend in a transverse direction relative to the array axii $X_{A1}$ and $X_{A2}$. Such a configuration ensures uniform diffusion of the light from the first and second base illuminating light sources 28*a*, 28*b* and prevents the formation of areas of brighter light on the base member 24 (i.e., "hot spots"). If the direction of the grant pattern and the array axii are aligned or closely aligned, the hot spots may exist even if light from each array passes through a diffuser.

In view of the foregoing, it should be appreciated that the invention has several advantages over the prior art.

It should also be understood that when introducing elements of the present invention in the claims or in the above description of exemplary embodiments of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. Alighting element configured to be mounted on a mounting surface, such as a wall or ceiling, the lighting element comprising: a base member adapted to be adjacent the mounting surface when the lighting element is mounted on the mounting surface, the base member having a base member front surface positioned to face away from the mounting surface when the lighting element is mounted on the mounting surface; at least one forward member having a forward member front surface and a forward member rear surface opposite the forward member front surface, the forward member rear surface being spaced from and in face-to-face relationship with the base member front surface, the forward member rear surface being spaced from the base member front surface a distance of not more than two inches; the forward member front surface lying in a first plane, the forward member rear surface lying in a second plane, the first plane being spaced from the second plane a distance of at least one-fourth inch and not more than one-half inch; at least one base-illuminating light source, the at least one base-illuminating light source being a chip-on-board solid state lighting source adapted to emit light; the at least one forward member and the at least one base-illuminating light source being thermally coupled such that the at least one forward member acts as a heat sink for the at least one base-illuminating light source; wherein the at least one forward member has a thermal conductivity greater than 50 W/m-K at 20° Celsius and a surface area greater than 125 square inches.

2. The lighting element of claim 1 wherein the at least one forward member has a thermal conductivity greater than 100 W/m-k at 20° Celsius and a surface area greater than 125 square inches.

3. The lighting element of claim 1 wherein the at least one forward member comprises first and second pieces, and the at least one base-illuminating light source comprises a first base-illuminating light source and a second base-illuminating light source, the first piece being thermally connected to the first base-illuminating light source such that the first piece acts as a heat sink for the first base-illuminating light source, the second piece being thermally connected to the second base-illuminating light source such that the second piece acts as a heat sink for the second base-illuminating light source.

4. A lighting element configured to be mounted on a mounting surface, such as a wall or ceiling, the lighting element comprising:

a base member adapted to be adjacent the mounting surface when the lighting element is mounted on the mounting surface, the base member having a base member front surface positioned to face away from the mounting surface when the lighting element is mounted on the mounting surface;

at least one forward member having a forward member front surface and a forward member rear surface opposite the forward member front surface, the forward member rear surface being spaced from and in face-to-face relationship with the base member front surface, the forward member rear surface being spaced from the base member front surface a distance of not more than two inches;

at least one base-illuminating light source, the at least one base-illuminating light source being a chip-on-board solid state lighting source adapted to emit light;

the at least one forward member and the at least one base-illuminating light source being thermally coupled such that the at least one forward member acts as a heat sink for the at least one base-illuminating light source; and wherein the at least one forward member has a thermal conductivity greater than 100 W/m-k at 20° Celsius and a surface area greater than 125 square inches.

5. The lighting element of claim 4 wherein the at least one forward member comprises first and second pieces, and the at least one base-illuminating light source comprises a first base-illuminating light source and a second base-illuminating light source, the first piece being thermally connected to the first base-illuminating light source such that the first piece acts as a heat sink for the first base-illuminating light source, the second piece being thermally connected to the second base-illuminating light source such that the second piece acts as a heat sink for the second base-illuminating light source.

6. Alighting element configured to be mounted on a mounting surface, such as a wall or ceiling, the lighting element comprising: a base member adapted to be adjacent the mounting surface when the lighting element is mounted on the mounting surface, the base member having a base member front surface positioned to face away from the mounting surface when the lighting element is mounted on the mounting surface; at least one forward member having a forward member front surface and a forward member rear surface opposite the forward member front surface, the forward member rear surface being spaced from and in face-to-face relationship with the base member front surface, the forward member rear surface being spaced from the base member front surface a distance of not more than two inches; at least one base-illuminating light source, the at least one base-illuminating light source being a chip-on-board solid state lighting source adapted to emit light; the at least one forward member and the at least one base-illuminating light source being thermally coupled such that the at least one forward member acts as a heat sink for the at least one base-illuminating light source; wherein the at least one forward member has a thermal conductivity greater than 50 W/m-K at 20° Celsius and a surface area greater than 125 square inches.

7. The lighting element of claim 6 wherein the at least one forward member comprises first and second pieces, and the at least one base-illuminating light source comprises a first base-illuminating light source and a second base-illuminating light source, the first piece being thermally connected to the first base-illuminating light source such that the first piece acts as a heat sink for the first base-illuminating light source, the second piece being thermally connected to the second base-illuminating light source such that the second piece acts as a heat sink for the second base-illuminating light source.

* * * * *